United States Patent
Malrait et al.

(10) Patent No.: US 9,509,241 B2
(45) Date of Patent: Nov. 29, 2016

(54) CONTROL METHOD FOR STARTING A SYNCHRONOUS ELECTRIC MOTOR

(71) Applicant: Schneider Toshiba Inverter Europe SAS, Pacy sur Eure (FR)

(72) Inventors: Francois Malrait, Jouy sur Eure (FR); Thomas Devos, Carrieres sous Poissy (FR); Rudolf Fehringer, Vienna (AT)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 14/738,088

(22) Filed: Jun. 12, 2015

(65) Prior Publication Data

US 2015/0381088 A1 Dec. 31, 2015

(30) Foreign Application Priority Data

Jun. 30, 2014 (FR) ...................................... 14 56154

(51) Int. Cl.
  *H02P 6/20* (2016.01)
(52) U.S. Cl.
  CPC ................. *H02P 6/205* (2013.01); *H02P 6/21* (2016.02)
(58) Field of Classification Search
  CPC ....... H02P 21/003; H02P 21/10; H02P 6/205
  See application file for complete search history.

(56) References Cited

U.S. PATENT DOCUMENTS

| 5,844,397 A | 12/1998 | Konecny et al. |
| 7,508,160 B1 | 3/2009 | Rudniski |
| 2009/0273308 A1* | 11/2009 | Matsuo ............... H02P 21/0003 318/450 |

OTHER PUBLICATIONS

French Preliminary Search Report with written opinion issued May 11, 2015 in French Application 14 56154 filed on Jun. 30, 2014 (with English Translation of Categories of Cited Documents).

* cited by examiner

*Primary Examiner* — Karen Masih
(74) *Attorney, Agent, or Firm* — Oblon, McClelland, Maier & Neustadt, L.L.P.

(57) ABSTRACT

A control method used in a control unit of a power converter, connected by three output phases to a synchronous electric motor, the method being used for starting the motor and including a first step for determining the voltages to be applied to the output phases depending on a reference current, a second step for determining a frequency to be applied to the stator depending on a stator frequency, a step for application of the first step and the second step for a given duration, so as to allow the rotor of the synchronous electric motor to rotate at the stator frequency applied. The method is particularly effective for an architecture including a transformer and a sinus filter between the power converter and the electric motor.

8 Claims, 2 Drawing Sheets

CONTROL METHOD FOR STARTING A SYNCHRONOUS ELECTRIC MOTOR

TECHNICAL FIELD OF THE INVENTION

The present invention relates to a control method used for starting a synchronous electric motor.

The invention also relates to a power converter comprising a control unit configured to implement said control method.

PRIOR ART

In order to start a synchronous electric motor, it is required to know the position of its rotor. In open-loop operation, namely without using a mechanical (speed or position) sensor, there exist methods for estimating the position of the rotor of the electric motor. One solution consists in injecting a direct current in the output phases so as to cause the rotor to rotate until it is aligned.

The document U.S. Pat. No. 7,202,618 proposes another solution which consists in sending voltage pulses to each of the phases of the motor during a given period and determining the peaks of the currents which have circulated in the phases of the motor. Then, by comparing the currents obtained for each phase and based on the relationship between the currents, the initial position of the rotor may be calculated.

However, these solutions are not always suitable for the overall architecture used. In fact, if the variable speed drive is connected to the permanent-magnet synchronous electric motor via a sinus filter, a transformer and long cables, the known solutions for determining the position of the rotor of the electric motor will not be operationally suitable. The prolonged injection of a direct current, and therefore the application of a direct voltage, will tend to saturate the transformer thus preventing any position detection. The second solution involving voltage pulses quite simply cannot be applied owing to the presence of passive filtering elements between the variable speed drive and the electric motor.

The object of the invention is therefore to propose a control method allowing starting of a synchronous electric motor, even if it is integrated in an architecture such as that described above, namely also including a sinus filter, a transformer and long cables.

SHORT DESCRIPTION OF THE INVENTION

This object is achieved by a control method used in a control unit of a power converter connected by three output phases to a synchronous electric motor, said control unit being configured to implement a main control law for controlling the synchronous electric motor, said control method being configured to replace said main control law upon starting of the synchronous electric motor and comprising:
- a first step for determining the voltages to be applied to the output phases depending on a reference current, said reference current having a value at least higher than a first threshold value necessary for starting the synchronous electric motor;
- a second step for determining a frequency to be applied to the stator depending on a stator frequency, said stator frequency being chosen higher than a second given threshold value;
- a step for application of the first step and the second step for a given duration, at least equal to the reciprocal of the stator frequency, so as to allow the rotor of the synchronous electric motor to rotate at the stator frequency applied;
- a step for switching the synchronous electric motor to the main control law once the rotor rotates at a speed corresponding to said stator frequency.

According to a particular feature of the control method of the invention, the reference current is kept at a constant value during the first step.

According to another particular feature, the control method includes a prior step for application of a ramp for the reference current so as to raise it up to said constant value.

According to another particular feature, the stator frequency is also kept at a constant value during the second step.

According to another particular feature, the method comprises a step of reducing the reference current below the first threshold value, prior to the step for switching to the main control law.

The invention also concerns a system for controlling a synchronous electric motor comprising a control unit having a main control law which can be executed so as to control the synchronous electric motor and a starting sequence for replacing said main control law upon starting of the synchronous electric motor, said control unit comprising:
- a first module for determining the voltages to be applied to the output phases depending on a reference current, said reference current having a value at least higher than a first threshold value necessary for starting the synchronous electric motor;
- a second module for determining a frequency to be applied to the stator depending on a stator frequency, said stator frequency being chosen higher than a second given threshold value, said first module and second module being executed for a given duration, at least equal to the reciprocal of the stator frequency, so as to allow the rotor of the synchronous electric motor to rotate at the stator frequency applied;
- a module for switching the synchronous electric motor to the main control law once the rotor rotates at a speed corresponding to said stator frequency.

Advantageously, the control system has a power converter connected to the synchronous electric motor by three output phases and controlled by said control unit.

Advantageously, the power converter is connected to the synchronous electric motor via a sinus filter and a transformer.

BRIEF DESCRIPTION OF THE FIGURES

Other characteristic features and advantages will become clear from the following detailed description provided with reference to the accompanying drawings in which.

DETAILED DESCRIPTION OF AT LEAST ONE EMBODIMENT

The control method is implemented in a control unit UC and is configured to allow starting of an electric motor of the synchronous type. Advantageously the electric motor M is of the three-phase permanent-magnet synchronous type.

Advantageously, the control unit UC may be arranged inside a power converter of the variable speed drive type D.

Figure 1:
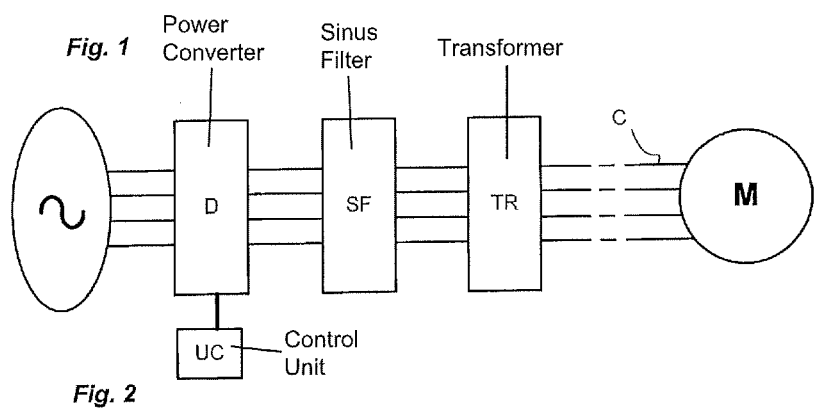
FIG. 1 shows an example of architecture in which the control method according to the invention may be more particularly employed.

This method is particularly suitable for controlling starting of the permanent-magnet synchronous electric motor M when the latter is connected to the variable speed drive D via a sinus filter SF, a transformer TR and long cables C, for example having a length of more than two kilometers. This architecture is shown in FIG. 1. In the description below the method according to the invention will be described in connection with this architecture. However, it should be understood that the method according to the invention may also be implemented for a different architecture.

With reference to FIG. 1, the variable speed drive D is connected upstream of the electric supply network N by three input phases R, S and T. In a known manner, the variable speed drive D has an input stage composed of a rectifier, for example of the diode-bridge type, configured to rectify the alternating voltage supplied by the network N. The variable speed drive D also has a continuous power supply bus connected to the rectifier and comprising two power supply lines connected together by one or more bus capacitors. The variable speed drive also has an output stage composed of an inverter receiving a direct voltage supplied by the continuous power supply bus and controlled so as to output variable voltages to the synchronous electric motor M. In the architecture shown in FIG. 1, the variable speed drive D is connected at its output by three output phases U, V, W to a sinus filter SF. In a known manner, a sinus filter is a low-pass filter which allows motor voltages to be supplied between phases which are sinusoidal. The sinus filter SF is for its part connected to a transformer TR having the function of transforming a low voltage into a high voltage. The transformer TR is then connected to the synchronous electric motor M via long cables. The control method according to the invention will be particularly effective when the cables have a length of more than two kilometers. In FIG. 1, an additional wire is employed for the connections to earth.

In a known manner, the control unit UC of the variable speed drive D uses a main control law L in order to control the inverter and determine the output voltages necessary for operation of the electric motor M (block B1 in FIG. 1). Conventionally, this main control law L has at its input a reference speed (or frequency) ωref on the basis of which it determines a reference torque current (not shown). It also receives at its input a reference flux current Idref. Based on the reference torque current and the reference flux current and measurements or estimations of the flux current Id and the torque current Iq, it determines references voltages Vdref, Vqref on the basis of which the single voltages V1, V2, V3 to be applied to each output phase are determined (block B4).

When the synchronous electric motor M is started, the position of the rotor is unknown by the control unit UC of the variable speed drive D, preventing the implementation of the main control law L. When the synchronous electric motor M is started, a specific sequence must be implemented to ensure that the position of the rotor is known. With the control method according to the invention it is possible to create a rotational starting sequence ST (FIG. 2) of the motor. For starting of the synchronous electric motor, the control method according to the invention thus replaces the main control law L.

Figure 2:
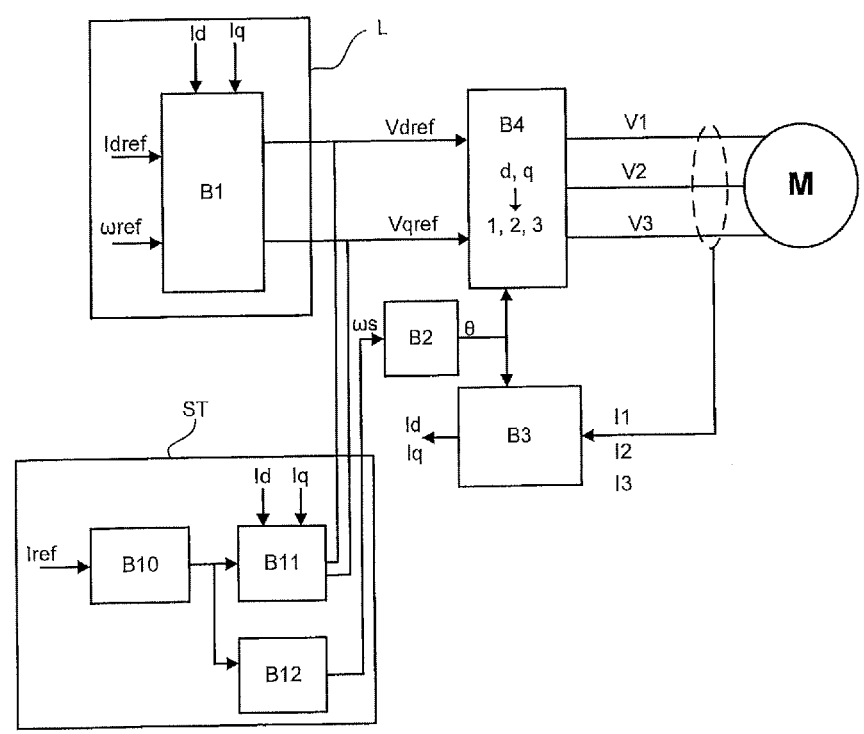
FIG. 2 shows, in a schematic manner, a diagram illustrating the control method according to the invention used for starting the synchronous electric motor.

With reference to FIG. 2, the control method according to the invention, which is implemented in the control unit for starting the synchronous electric motor, comprises the main steps which are described below.

Figure 3A:
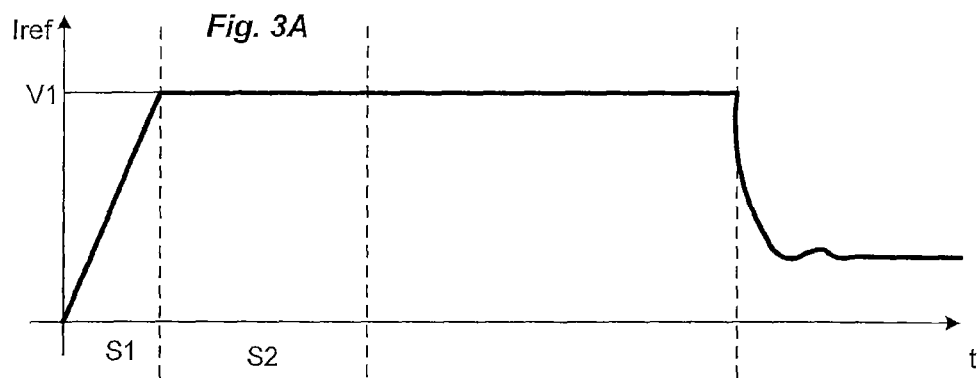
FIGS. 3A and 3B show current and frequency curves illustrating the starting sequence according to the invention.

During a first step, the control method consists in determining and applying a reference current Iref (block 10). This reference current Iref is chosen at a value higher than a first reference value, corresponding to the minimum current to be applied in order to cause rotation of the synchronous electric motor, i.e. corresponding to the minimum load current. FIG. 3A shows the progression of the reference current I1ref applied to the input. In said FIG. 3A it can be seen that there is a rising current ramp up to a value V1 which is chosen to be higher than said first threshold value (S1). The reference current Iref is then kept at the value V1 (S2). Preferably, as shown in FIG. 3A, the value V1 reached is chosen so as to be constant and the current is kept at this value during the whole of the starting sequence ST. The choice of the current and frequency values is explained by the reasoning provided below.

The study described does not take into account the sinus filter, but may be extended to include it without difficulty.

Let us consider the different parts of the system. The simplified equations of the transformer for a phase are:

$$n_1 \frac{d\varphi}{dt} = u_1$$

$$n_2 \frac{d\varphi}{dt} = u_2$$

$$n_1 i_1 - n_2 i_2 = \mathfrak{R} \, \varphi$$

Where $u_1$ and $i_1$ are the voltage and the current on the primary winding of the transformer, $u_2$ and $i_2$ are the voltage and the current on the secondary winding of the transformer, $n_1$ and $n_2$ are the number of turns on the primary winding and secondary winding of the transformer respectively, $\varphi$ is the magnetic flux, and $\mathfrak{R}$ is the reluctance of the transformer.

Considering a perfect transformer ($\mathfrak{R}=0$), the following basic conditions of the transformer are present:

$$\frac{u_2}{u_1} = \frac{n_2}{n_1} = \frac{i_1}{i_2}$$

In reality, the reluctance is not zero and the saturation of the flux of the transformer must be considered. A way of considering this saturation is to have a variable reluctance $\mathfrak{R}(\varphi)$ dependent on the equivalent linear flux. $\mathfrak{R}$ increases with the flux. In this case, the magnetizing current and the current on the primary winding increase rapidly.

From a control point of view, the current on the primary winding of the transformer no longer is representative of the current on the secondary winding and therefore of the current in the synchronous electric motor. From an electronic point of view, the increase in the current generates additional losses and therefore greater thermal heating. It is therefore necessary to avoid this saturation zone and remain in the linear part of the transformer.

Still in general terms, let us consider a single sinusoidal voltage:

$$u_1 = U_{mod} \sin(\omega t - \alpha)$$

Where:
$U_{mod}$ is the amplitude of the voltage at the instant t
$\omega$ is the voltage pulsation
$\alpha$ is the voltage phase
The integration of this voltage gives us the following flux:

$$\varphi = -\frac{U_{mod}}{n_1 \cdot \omega} \cos(\omega t - \alpha) + cst$$

It can be seen therefore that there is a relationship between the pulsation of the voltage and the amplitude of the voltage so as to ensure a flux below the saturation threshold of the flux.

Let us now consider the equations of the motor. In stable conditions (motor rotating at a fixed frequency and stable currents), at the rotating reference point with angle $\theta_s$, the following are defined:

$$u_{sd} = R_s i_d - \omega_s L_q i_q$$
$$u_{sq} = R_s i_q - \omega_s L_d i_d + \omega_r \Phi_m$$
$$\omega_r = \omega_s$$
$$\frac{d\theta_s}{dt} = \omega_s$$

Where:
$R_s$ is the resistance of the stator,
$L_d$ and $L_q$ are the inductances with axes d and q of the motor,
$\omega_s$ is the stator frequency,
$i_d$ is the flux current measured,
$i_q$ is the torque current measured,
$u_{sd}$ is the voltage with axis d at the reference point d, q with angle $\theta_s$,
$u_{sq}$ is the voltage with axis qn at the reference point d, q with angle $\theta_s$,
$\phi_m$ is the permanent flux of the motor,
$n_p$ is the number of pairs of poles.

Finally, let us consider the equation of the system associated with the application (mechanical equation of the motor). The application providing a resistive load torque $\tau_c$, the electric motor torque $\tau_m$ must be greater than the load torque in order to start the motor. At the Park reference point d,q associated with the motor, the following is defined:

$$\tau_m = \frac{3}{2} n_p (\Phi_m i_q + (L_d - L_q) i_d i_q) \geq \tau_c$$

This constraint may be written as a constraint on the module of the current $$\|i(t)\| = \sqrt{i_d^2 + i_q^2} > I_c,$$

where $I_c$ is the minimum current value allowing the constraint on the torque to be verified.

If we consider the complete system, the following are present:

The equations of the motor giving a relation of equality between the voltage, the current and the stator frequency.

The application providing a constraint on the current level.

The transformer providing a constraint between the voltage level and the stator frequency.

If non-constant speed and current progressions are considered, the generalization of the constraint of the complete system is equivalent to the expression (considering sinusoidal voltages):

For the whole of T, $\int_0^T (V(i(t)) \sin(\int \omega(t))) dt < \phi_{max}$ with $\|i(t)\| > I_c$, where $\phi_{max}$ is the maximum flux admissible by the transformer before saturation.

Based on the reference current Iref and the values measured for the flux current Id and the torque current Iq, the control unit of the variable speed drive D determines the flux voltage Vdref and the reference torque voltage Vqref. Based on these flux and reference torque voltages, the control unit UC determines the single voltages V1, V2, V3 to be applied to each output phase (block B11).

Figure 3B:
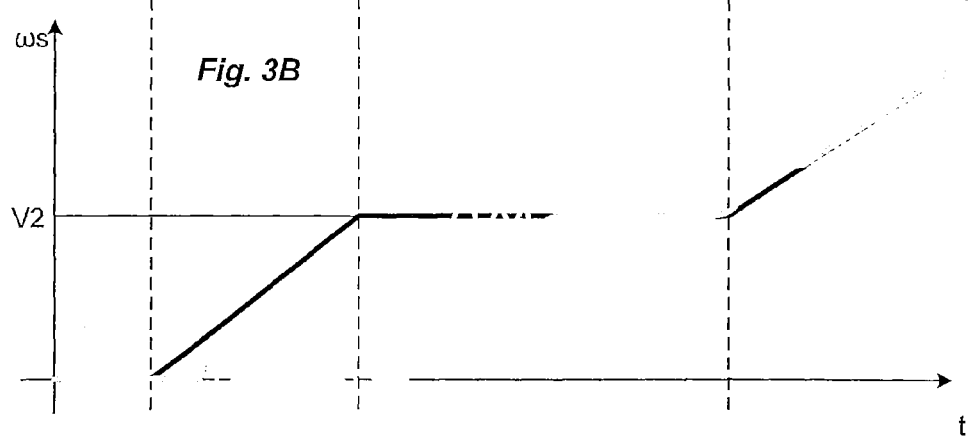

In a second step, the control unit UC determines a stator frequency $\omega s$ taking into account the reference current level Iref applied (block B12). The stator frequency $\omega s$ is chosen at a value which is as low as possible, but higher than a second threshold value, synonymous with saturation of the transformer, as explained by the example given above. FIG. 3B shows the progression of the stator frequency $\omega s$ applied at the input. In said FIG. 3B it can be seen that the stator frequency $\omega s$ is first selected at zero upon the rising ramp of the current and then it follows a rising ramp once the reference current Iref reaches its constant value. Then the stator frequency $\omega s$ is preferably stabilised at its chosen constant value V2. It is stabilised at this value V2 until the end of the starting sequence. In FIG. 3B the grey curve represents the frequency of the rotor and therefore the real speed of the electric motor.

The control unit UC implements a module for integration of the stator frequency (block B2) so as to determine an angle ƒ defining the three components V1, V2, V3 of the voltage vector V at the reference point 1, 2 and 3 in accordance with the following relations:

$$V_1 = \|V\| \cdot \cos\theta$$
$$V_2 = \|V\| \cdot \cos\left(\theta - \frac{2\pi}{3}\right)$$
$$V_3 = \|V\| \cdot \cos\left(\theta + \frac{2\pi}{3}\right)$$

The angle determined will also be used to estimate the flux current Id and the torque current Iq from the currents I1, I2, I3 measured on the three output phases U, V, W.

As during starting of the motor, the rotor is not aligned, the real frequency of the rotor does not follow the stator frequency $\omega s$ (FIG. 3B). The control unit therefore maintains the current and frequency control for a given time period (time period at least greater than the reciprocal of the stator frequency) so as to ensure the rotation of the motor (thus the motor speed should be equal to the reference speed).

Once the rotor is engaged, the control unit knows the frequency of the motor, this being equal to the frequency of the voltage output by the variable speed drive, as well an estimation of the angle θ of the rotor.

Figure 4A:
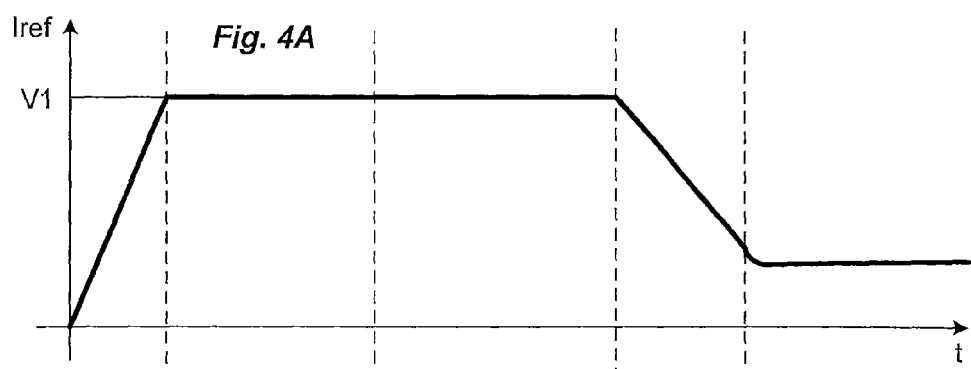
FIGS. 4A and 4B show a variation of embodiment of the sequence shown in FIGS. 3A and 3B.
Figure 4B:
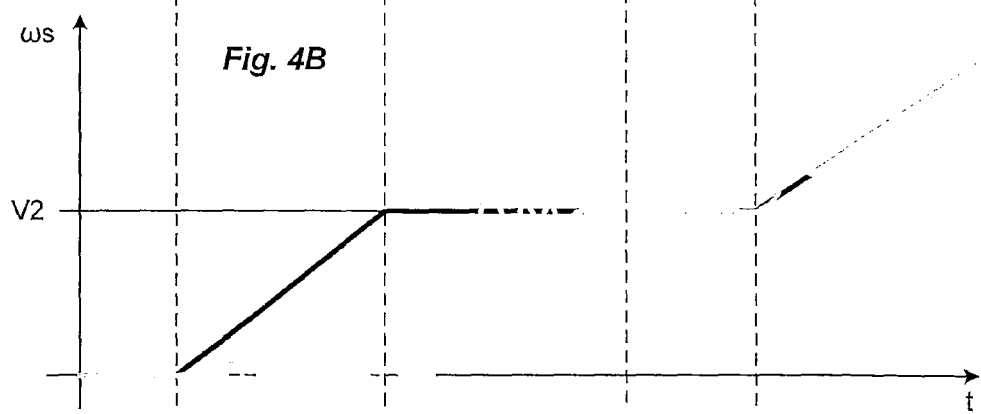

The control unit then switches the control of the synchronous electric motor to the main control law L. The reference voltages Vdref and Vqref are calculated in this case by the main control law L. All the states of the control law are updated during the transition in order to ensure the continuity of the variables. In FIG. 3B it can be seen that switching to the main control law L causes a disturbance of the real frequency of the stator when the reference current is lowered too rapidly. In an advantageous embodiment of the invention, after the real frequency of the rotor has reached the stator frequency ωs and before switching to the main control law L, the reference current Iref is gradually reduced with a descending ramp. Switching to the main control law L is thus achieved when the current has reached its chosen low value, thus allowing an attenuation of the frequency disturbance. FIGS. 4A and 4B illustrate this advantageous control principle. In FIG. 4B the grey curve represents the frequency of the rotor and therefore the real speed of the electric motor.

The invention claimed is:

1. A control method used in a control unit of a power converter connected by three output phases to a synchronous electric motor, said control unit being configured to implement a main control law for controlling the synchronous electric motor, wherein said control method is configured to replace said main control law upon starting of the synchronous electric motor and wherein said control method comprises:

a first step of determining the voltages to be applied to the output phases depending on a reference current, said reference current having a value at least higher than a first threshold value necessary for starting the synchronous electric motor;

a second step of determining a frequency to be applied to the stator depending on a stator frequency, said stator frequency being chosen higher than a second given threshold value;

applying the first step and the second step for a given duration, at least equal to the reciprocal of the stator frequency, so as to allow the rotor of the synchronous electric motor to rotate at the stator frequency applied;

a step of switching the synchronous electric motor to the main control law once the rotor rotates at a speed corresponding to said stator frequency.

2. The method according to claim 1, wherein the reference current is kept at a constant value during the first step.

3. The method according to claim 2, comprising a step of applying a ramp for the reference current so as to raise said reference current up to said constant value.

4. The method according to claim 2, wherein the stator frequency is kept at a constant value during the second step.

5. The method according to claim 1, comprising a step of reducing the reference current below the first threshold value, prior to the step for switching to the main control law.

6. A system for controlling a synchronous electric motor comprising a control unit having a main control law which can be executed so as to control the synchronous electric motor and a starting sequence configured to replace said main control law upon starting of the synchronous electric motor, said control unit further comprising:

a first module for determining the voltages to be applied to the output phases depending on a reference current, said reference current having a value at least higher than a first threshold value necessary for starting the synchronous electric motor;

a second module for determining a frequency to be applied to the stator depending on a stator frequency, said stator frequency being chosen higher than a second given threshold value, said first module and second module being executed for a given duration, at least equal to the reciprocal of the stator frequency, so as to allow the rotor of the synchronous electric motor to rotate at the stator frequency applied;

a module for switching the synchronous electric motor to the main control law once the rotor rotates at a speed corresponding to said stator frequency.

7. The control system according to claim 6, comprising a power converter connected to the synchronous electric motor by three output steps and controlled by said control unit.

8. The control system according to claim 7, wherein the power converter is connected to the synchronous electric motor via a sinus filter and a transformer.

* * * * *